United States Patent
Peale et al.

(10) Patent No.: US 12,548,893 B2
(45) Date of Patent: Feb. 10, 2026

(54) ANTENNA-COUPLED GRAPHENE JOSEPHSON-JUNCTION THZ/MM-WAVE APPARATUS

(71) Applicant: University of Central Florida Research Foundation, Inc., Orlando, FL (US)

(72) Inventors: Robert Peale, Orlando, FL (US);
Masahiro Ishigami, Orlando, FL (US);
Michael S. Lodge, Orlando, FL (US);
Richard Klemm, Orlando, FL (US);
Francisco Javier Gonzalez, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 32 days.

(21) Appl. No.: 18/656,026

(22) Filed: May 6, 2024

(65) Prior Publication Data
US 2025/0316895 A1    Oct. 9, 2025

Related U.S. Application Data

(60) Provisional application No. 63/512,199, filed on Jul. 6, 2023.

(51) Int. Cl.
*H01Q 1/36* (2006.01)
*H01Q 1/38* (2006.01)
*H10N 60/01* (2023.01)
*H10N 60/12* (2023.01)
*H10N 99/00* (2023.01)

(52) U.S. Cl.
CPC ............. *H01Q 1/368* (2013.01); *H01Q 1/38* (2013.01); *H10N 60/0241* (2023.02); *H10N 60/12* (2023.02); *H10N 99/05* (2023.02)

(58) Field of Classification Search
CPC ......................... H10N 60/12; H10N 60/128
See application file for complete search history.

(56) References Cited

U.S. PATENT DOCUMENTS

2021/0140833 A1*    5/2021    Efetov .................. G01J 5/20

OTHER PUBLICATIONS

Jin, C., and Qiao, Q. (May 11, 2016). "Deformation of Pyramidal PDMS Stamps During Microcontact Printing." ASME. J. Appl. Mech. Jul. 2016; 83(7): 071011. https://doi.org/10.1115/1.4033432 (Year: 2016).*

(Continued)

*Primary Examiner* — Matthew L Reames
(74) *Attorney, Agent, or Firm* — Andrew Behrens; Trenam Law

(57) ABSTRACT

Described herein relates to an antenna-coupled graphene Josephson-junction THz/mm-wave apparatus (hereinafter "video") detector apparatus and methods thereof. Highly sensitive, broadly tunable detectors may be needed for future sensing applications and quantum information systems. In an embodiment, the video detector apparatus may comprise stacked graphene sheets having a "magic" twist angle between their in-plane symmetry axes. As such, the material may display superconductivity with at least 2 K transition temperature. Additionally, the video detector apparatus may depend on the decrease in the maximum zero-voltage DC current when AC current is driven through the junction.

10 Claims, 15 Drawing Sheets

(56) References Cited

OTHER PUBLICATIONS

De Vries, F.K., Portolés, E., Zheng, G. et al. Gate-defined Josephson junctions in magic-angle twisted bilayer graphene. Nat. Nanotechnol. 16, 760-763 (2021). https://doi.org/10.1038/s41565-021-00896-2 (Year: 2021).*

Purdie, D.G., Pugno, N.M., Taniguchi, T. et al. Cleaning interfaces in layered materials heterostructures. Nat Commun 9, 5387 (2018). https://doi.org/10.1038/s41467-018-07558-3 (Year: 2018).*

Charles H. Bennett et al. "Quantum cryptography: Public key distribution and coin tossing" 2014 pp. 7-11. vol. 560. Theoretical Computer Science.

F.J. Gonzalez et al. "Comparison of dipole, bowtie, spiral and log-periodic IR antennas" 2005. pp. 418-428. vol. 46. Infrared Physics & Technology.

M. D. Eisaman et al. "Invited Review Article: Single- photon sources and detectors" 2011. pp. 1-26 vol. 82. Review of Scientific Instruments.

V. F. Guedes et al. "Discrete Variable Quantum Key Distribution in Millimeter-Wave and THz Regions" Oct. 30, 2023. pp. 1-4. IEEE Photonic Technology Letters.

Balanis, Constantine et al. "Antenna Theory : Analysis and Design" 2016. 4th vol. John Wiley & Sons.

Giorgio Battista et al. "Revealing the Thermal Properties of Superconducting Magic-Angle Twisted Bilayer Graphene" nano Letters. 2022, 22, pp. 6465-5470.

Andreij C. Gadelha et al."Twisted Bilayer Graphene: a Versatile Fabrication Method and the Detection of Variable Nanometric Strain Caused by Twist-Angle Disorder" ACS Appl. Nano Mater. 2021, pp. 1858-1866. vol. 4.

Hideomi Hashiba et al. "Sensing individual terahertz photons" 2010, 165203, 5pp, Nanotechnology 21.

Evan D. Walsh et al. "Graphene-Based Josephson-Junction Single-Photon Detector" 2017, 024022, vol. 8. Physical Review Applied.

P. L. Richards. "The Josephson Junction as a Detector of Microwave and Far-Infrared Radiation" 1965. Chapter 6. Semiconductors and Semimetals, vol. 12, ed. by R.K. Willardson, A.C. Beer, pp. 395-439.

Jeong Min Park et al. "Robust superconductivity in magic-angle multilayer graphene family" Aug. 2022, pp. 877-883. vol. 21. Nature Materials.

Gil-Ho Lee et al. "Graphene-based Josephson junction microwave bolometer" 2020. pp. 41-54. vol. 586. Nature.

R. Kokkoniemi et al. "Bolometer operating at the threshold for circuit quantum electrodynamics" 2020 pp. 47-61. vol. 586. Nature.

Evan D. Walsh et al. "Josephson junction infrared single-photon detector" 2021, pp. 409-412. vol. 372. Science.

Xu Du et al. "Graphene-based Bolometers" Graphene 2D Mater. 2014; 1:1-22.

* cited by examiner

ANTENNA-COUPLED GRAPHENE JOSEPHSON-JUNCTION THZ/MM-WAVE APPARATUS

CROSS-REFERENCE TO RELATED APPLICATIONS

This nonprovisional patent application claims priority to U.S. Provisional Patent Application No. 63/512,199 entitled "ANTENNA-COUPLED GRAPHENE JOSEPHSON-JUNCTION THZ/MM-WAVE APPARATUS" filed Jul. 6, 2023 by the same inventors, all of which is incorporated herein by reference, in its entirety, for all purposes.

FEDERALLY SPONSORED RESEARCH OR DEVELOPMENT

This invention was made with Government support under Grant No. W911NF-22-P-0026 awarded by the United States Army Office of the Secretary of Defense (hereinafter "OSD"). The government has certain rights in the invention.

BACKGROUND OF THE INVENTION

1. Field of the Invention

This invention relates, generally, to broadly design-tunable detectors. More specifically, it relates to an antenna-coupled graphene Josephson-junction THz/mm-wave detector apparatus and methods thereof operating via a particular non-thermal (non-bolometric) detection mechanism. This mechanism was coined the "video" mechanism in early literature on conventional (non-graphene) superconducting JJs [3], to distinguish it from the thermal bolometric mechanism. The video mechanism depends on the effect of an AC voltage at GHz to THz frequencies across the Josephson-junction on its DC current-voltage curve. The effect is related to the appearance of so-called "Shapiro steps" in that curve [3]. For convenience, herein we will refer to a Josephson-junction detector based on the said non-thermal video mechanism as a "video detector", while a detector based on the said thermal mechanism will be called a "bolometer".

2. Brief Description of the Prior Art

Emerging 5G and 6G (mm-wave to THz) technologies offer a promising new spectral domain for quantum communication and cryptography. Quantum protocols for secure communication usually require single photon detection, and high data rates require high speed detection of individual photons at high photon flux. [1]. One such single-photon detector of mm-waves to low-THz has been suggested to accommodate these needs for simultaneous high sensitivity and speed [2]. We teach an alternative and novel opportunity fast and sensitive THz to mm-wave detection based on the "video" mechanism [3] in an antenna-coupled, for example, magic-angle-twist-graphene superconducting Josephson junction (hereinafter "JJ") device [4].

JJs also always have a bolometric detection mechanism, which can be very sensitive. However, the video-mechanism has "very great speed advantage over the bolometer" [3]. As such, many prior devices focus on JJ bolometers using non-superconducting-graphene as the weak link between conventional superconductors, as they have demonstrated some single-photon sensitivity [5]-[10]. In contrast, we conceive a detector based on the video (e.g., non-bolometric) mechanism in a JJ-based formed entirely from graphene. Namely, the superconducting and normal weak-link portions of the JJ are formed from the same piece of multi-layer magic-angle twist graphene. The potential speed advantage of the video-over bolometric-mechanism may have advantage for quantum communication and cryptography at high-bit-rate [11].

Accordingly, what is needed is an effective and highly-efficient antenna-coupled graphene Josephson-junction THz/mm-wave apparatus and methods thereof which provides substantial single-photon sensitivity at high speeds. However, in view of the art considered as a whole at the time the present invention was made, it was not obvious to those of ordinary skill in the field of this invention knew how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to an antenna-coupled graphene Josephson-junction THz/mm-wave (hereinafter "video") detector apparatus and methods thereof.

As such, an aspect of the present disclosure pertains to an antenna-coupled graphene Josephson-junction THz/mm-wave detector apparatus. In an embodiment, the apparatus may comprise the following: (a) a magic angle graphene stack; (b) at least one hexagonal boron nitride (hereinafter "hBN") flake, the at least one hBN flake disposed about at least one portion of an outer surface of the magic angle graphene stack; (c) at least one bottom-gate (hereinafter "BG") contact and/or at least one top-gate (hereinafter "TG") contact, such that the at least one BG contact and/or the at least one TG contact may be disposed about at least one portion of an outer surface of the at least one hBN flake; and (d) at least one bowtie antenna disposed about at least one portion of a top surface of the at least one hBN flake.

In some embodiments, the at least one hBN flake may encapsulate the entire outer surface of the magic angle graphene stack. In these other embodiments, the at least one bowtie antenna may be fabricated by contact photolithography. In this manner, a feed of the at least one bowtie antenna may be disposed about the top surface of the at least one hBN flake. Additionally, in these other embodiments, the at least one hBN flake may be a gate dielectric.

In some embodiments, the at least one bowtie antenna may be configured to collect a THZ/mm-wave radiation, such that an associated AC current may be sourced at the feed of the at least one bowtie antenna. In these other embodiments, the at least one bowtie antenna may comprise a noise-equivalent power of about 0.14 pW. Furthermore, the at least one bowtie antenna may also comprise a responsivity of about 7×106 V/W.

In some embodiments, the apparatus may further comprise an ideal junction disposed about at least a portion of the at least one bowtie antenna, the ideal junction being configured to carry at least a quasiparticle current. In these other embodiments, the ideal junction may comprise a pair tunneling current and/or a parallel shunt resistor. In this manner, the parallel shunt resistor may comprise a resistance of about 800Ω. The at least one bowtie antenna may comprise an impedance of about 300Ω at about 1.25 THz frequency.

In some embodiments, the impedance of the at least one bowtie antenna may be adjustable, such that subsequent to a shape of the at least one bowtie antenna being altered, a responsivity of the at least one bowtie antenna may be optimized. In these other embodiments, the at least one bowtie antenna may comprise a broad-spectrum noise amplitude of about 1 μV. In some embodiments, the magic angle graphene stack may be about 50 μm in height.

Another aspect of the present disclosure pertains to a method of fabricating an antenna-coupled graphene Josephson-junction THz/mm-wave detector apparatus. In an embodiment, the method may comprise the following steps: (a) providing a magic angle graphene stack; (b) encapsulating, via a cut and stack, the magic angle graphene stack with at least one hexagonal boron nitride (hereinafter "hBN") flake; (c) applying, via electron-beam litography, at least one bottom-gate (hereinafter BG") contact and/or at least one top-gate (hereinafter "TG") contact to at least one portion of an outer surface of the at least one hBN flake; and (d) disposing, via contact photolithography, at least one bowtie antenna about at least one portion of a top surface of the at least one hBN flake.

In some embodiments, the method may further comprise the step of, incorporating a pyramidal polydimethylsiloxane (hereinafter "PDMS") stamp onto the magic angle graphene stack. In these other embodiments, the method may further comprise the step of, transferring the magic angle graphene stack onto a prefabricated back gate. In this manner, the method may further comprise the step of, heating the magic angle graphene stack to about 175° C., such that a PC film may be melted, detaching it from the PDMS stamp. As such, the method may further comprise the step of, soaking the magic angle graphene stack in chloroform, dissolving all remaining residue of the melted PC film.

In some embodiments, bolometer apparatus may comprise astonishing sensitivity at the single-photon level at microwave to visible wavelengths. In this manner, the bolometer apparatus may comprise two conventional superconductors separated by a normal (non-superconducting) segment of graphene, in which the graphene serves as normal weak link between the said two conventional superconductors to form the JJ. Then, heating of the graphene by external radiation strongly affects the superconducting tunneling current across the JJ, giving rise to high sensitivity. The high sensitivity may be due in part to slow thermalization of heated electrons to the lattice temperature. This slow thermalization negatively affects the response time of the detector despite the small heat capacity of graphene. As is well established, high-sensitivity and high speed in bolometers are mutually exclusive, where an improvement in one characteristic always comes at a cost to the other characteristic. The video detector is based on a non-thermal mechanism, and its temporal response is not limited by a thermal time-constant. Thus the video detector has the potential to be faster than the bolometer.

Additionally, in some embodiments, there has been a report of bolometric response in superconducting magic-angle twisted bilayer graphene at 1.55 μm wavelength (with no JJ). In this manner, the bolometer may comprise a remarkably high temperature coefficient of resistance. For example, in these other embodiments, the remarkably high temperature coefficient of resistance may comprise 300%/K. However, the speed of this type of bolometer based on superconducting graphene is also limited by a thermal time constant for the dissipation of the heat generated by absorbed photons.

Moreover, in some embodiments, the video detector apparatus may comprise and/or be manufactured out of superconducting magic-angle twisted multilayer graphene. In these other embodiments, the video detector apparatus may not require the absorption of thermal energy at the JJ weak link, in contrast to a bolometer detector apparatus. In this manner, the video detector apparatus may also require only the appearance of an AC voltage across the JJ, without heat, such that the video detector apparatus may not be limited by thermal considerations. In some embodiments, the video detector apparatus may have a sensitivity quantified by a noise equivalent photon flux of at least 1 per 6 ns at sub-millimeter wavelengths.

In some embodiments, the video detector apparatus may also comprise an optimized speed over the bolometer detector apparatus. In some embodiments, the video detector apparatus may be uniquely attractive for certain single-photon applications. As such, the video detector apparatus may be preferred for applications such as quantum communication for high single-photon bit rates. In these other embodiments, any parasitic slow bolometric response of the video detector apparatus may be quenched by thermal anchoring without affecting the video response at all.

Furthermore, in some embodiments, magic-angle graphene (hereinafter "MAG") of the video detector apparatus may only be superconducting when properly gated to adjust the Fermi level into the region of the band structure flattened by the twist. In this manner, the weak link may also be created by gating. In these other embodiments, the sensitivity to gating for the MAG may allow the video detector apparatus to turn off when signal is not expected. In addition, in some embodiments, gated detection may be implemented to reduce noise within the video detector apparatus. In these other embodiments, gating may also be used to enable additional functionality, for instance to select between differently oriented antennas for polarization selection. For example, such selection is needed in the BB84 protocol for quantum cryptography.

In some embodiments, the MAG may be sandwiched between hexagonal boron nitride gate dielectrics. In this manner, the Fermi-level may also be manipulated by a voltage applied to a uniform bottom gate, so that superconductivity of the MAG of the video detector apparatus may appear when the level is at the flat-band created by the twist between graphene sheets. Moreover, top gates may be configured to provide additional control, such that the superconductivity of the video detector apparatus may be confined to regions on either side of a normal weak link, creating the JJ. As such, in these other embodiments, on either end, the graphene may be contacted by the tips of at least one antenna design (e.g., a bowtie antenna), which may be configured to collect the external radiation and source current (e.g., AC current) to the JJ at the antenna feed. In addition, in some embodiments, a current bias (e.g., a DC current) may be applied. In some embodiments a DC voltage appearing across the JJ may be measured via the antenna contacts.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
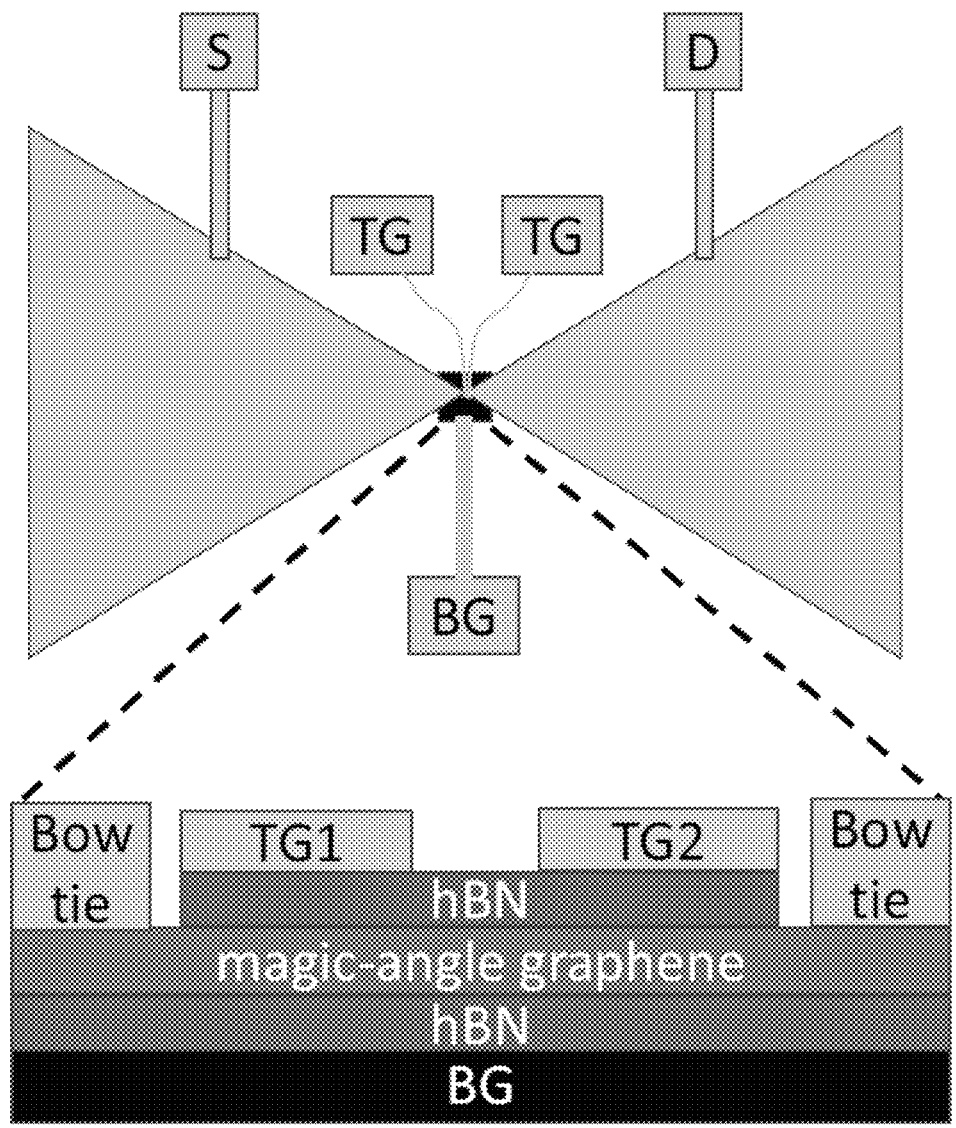
FIG. 1 is a diagrammatic image of a video detector apparatus, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term "communicatively coupled" refers to any coupling mechanism known in the art, such that at least one electrical signal may be transmitted between one device and one alternative device. Communicatively coupled may refer to Wi-Fi, Bluetooth, wired connections, wireless connection, and/or magnets. For ease of reference, the exemplary embodiment described herein refers to Wi-Fi and/or Bluetooth, but this description should not be interpreted as exclusionary of other electrical coupling mechanisms.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system) (e.g., the degree of precision required for a particular purpose, such as generating an antenna-coupled graphene Josephson-junction detector of THz/mm-wave photons based on a non-thermal "video" mechanism). As used herein, "about," "approximately," or "roughly" refer to within +25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Video Detector Apparatus

The present disclosure pertains to an antenna-coupled graphene Josephson-junction detector of THz/mm-wave photons based on a non-thermal "video" mechanism [3], (hereinafter "video detector apparatus") and methods thereof. In an embodiment, a superconducting transition temperature may be at least about 2 K for at least two layers of graphene in the video detector apparatus, such that a superconducting-graphene JJs may be demonstrated. In this manner, in this embodiment, ultrasensitive detector of THz and/or mm-waves may be generated by coupling at least one JJ to at least one antenna.

Device Fabrication

Figure 6:
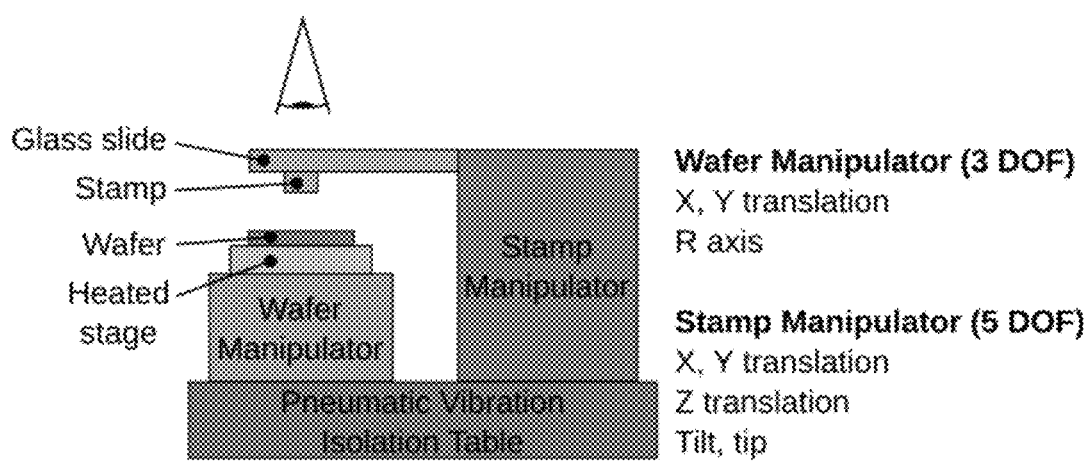
FIG. 6 is a diagrammatic image of a graphene stacking station for a video detector apparatus, according to an embodiment of the present disclosure.
Figure 7:
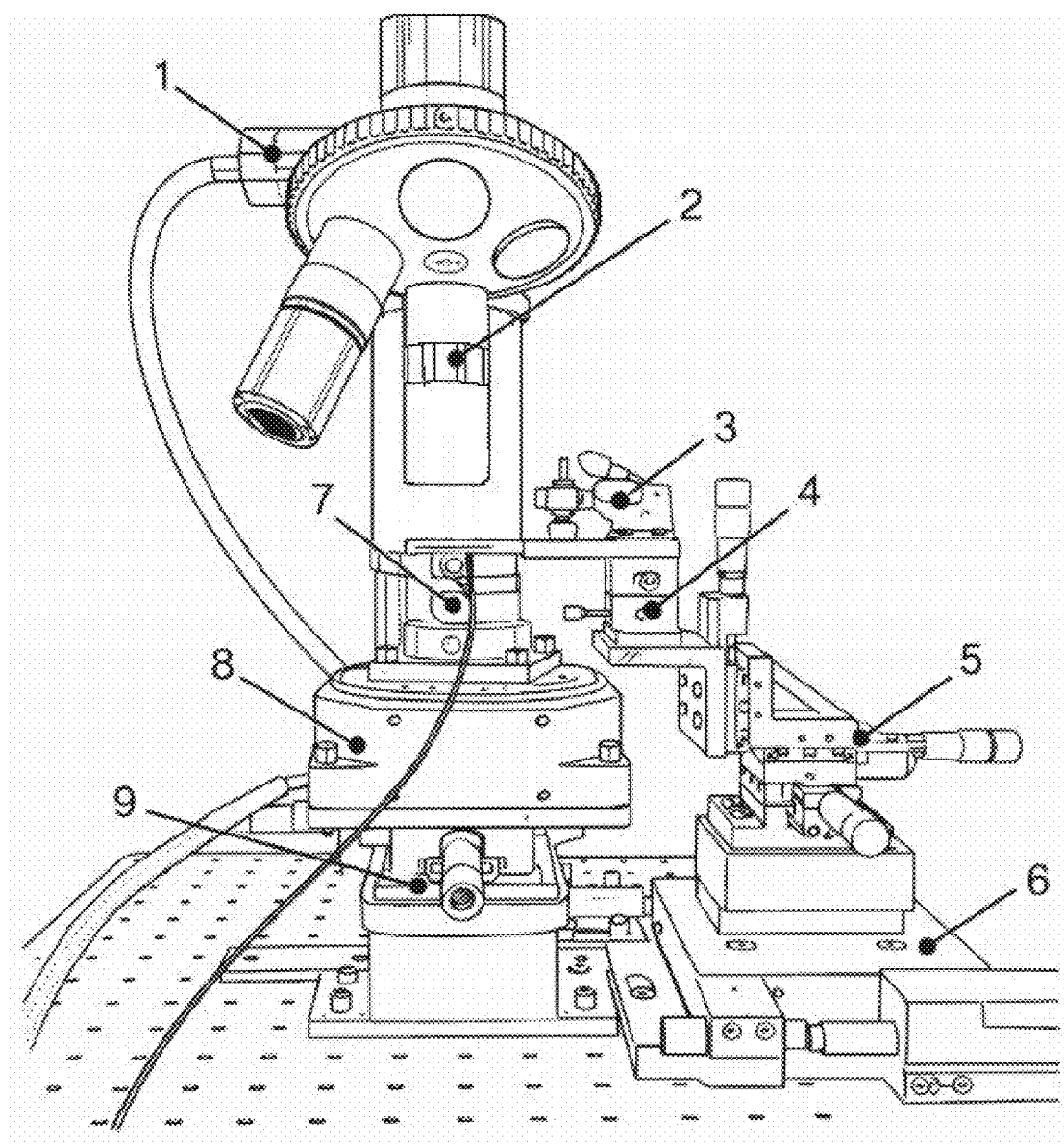
FIG. 7 is an image depicting a graphene stacking station for a video detector apparatus comprising (1) a fiber-guided, in-line white illumination source and (2) long focal-length, plan apochromat, infinity-corrected objectives; the stamp manipulator with (3) a toggle clamp, (4) a tilt-tip goniometer, (5) 3-axis translation stage, and (6) a long-throw, motorized translation stage; and the wafer manipulator with (7) a heated vacuum chuck, (8) a motorized rotation stage, and/or (9) a 2-axis translation stage, according to an embodiment of the present disclosure.
Figure 8A:
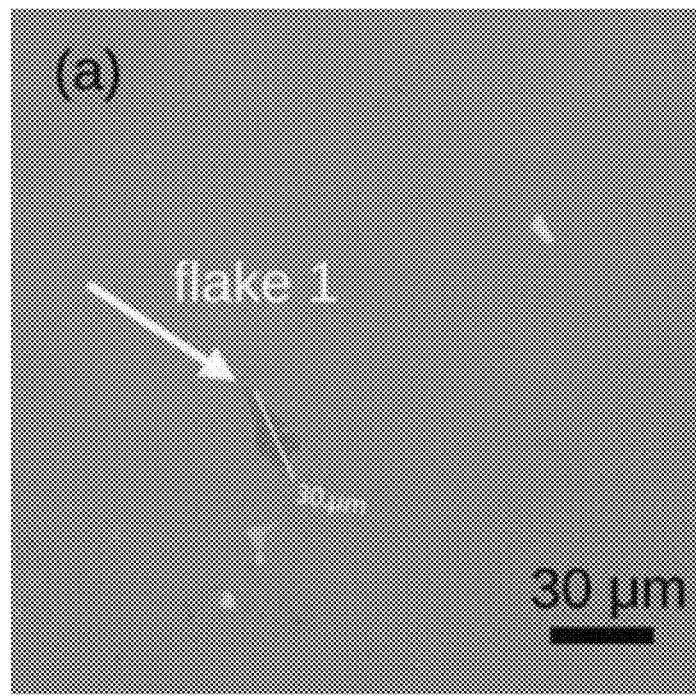
FIG. 8A is an image depicting an optical micrograph of a multilayer graphene flake exfoliated on $SiO_2$ (280 nm)/Si wafer, according to an embodiment of the present disclosure.
Figure 8B:
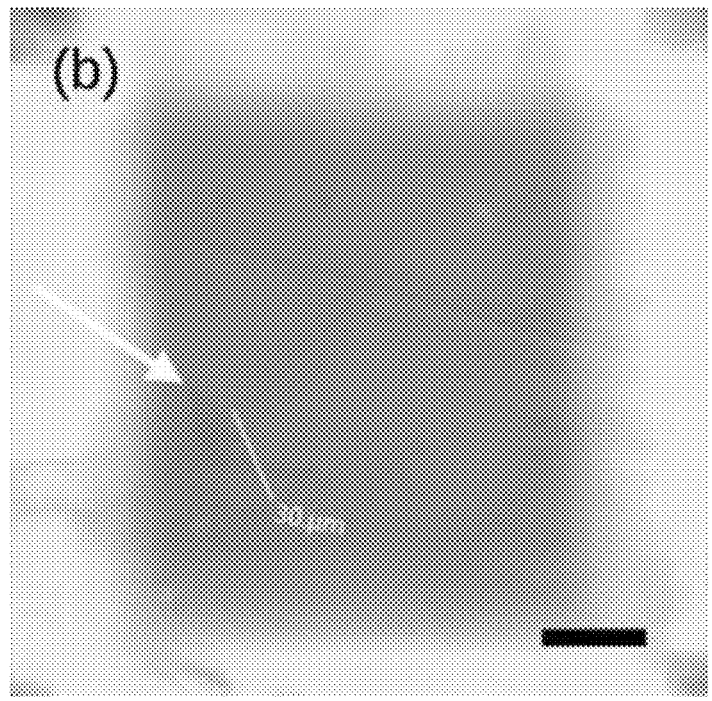
FIG. 8B is an image depicting a PDMS stamp aligned over the flake and engaged with another flake at room temperature, according to an embodiment of the present disclosure.
Figure 8C:
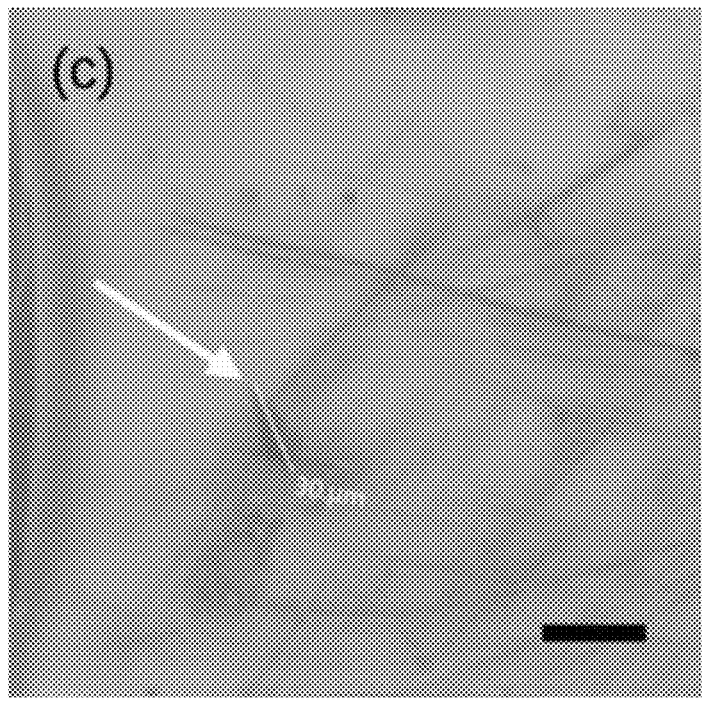
FIG. 8C is an image depicting a sample heated to 90° C., which increases the stickiness of the PC film, and the stamp is subsequently disengaged from the wafer, according to an embodiment of the present disclosure.
Figure 8D:
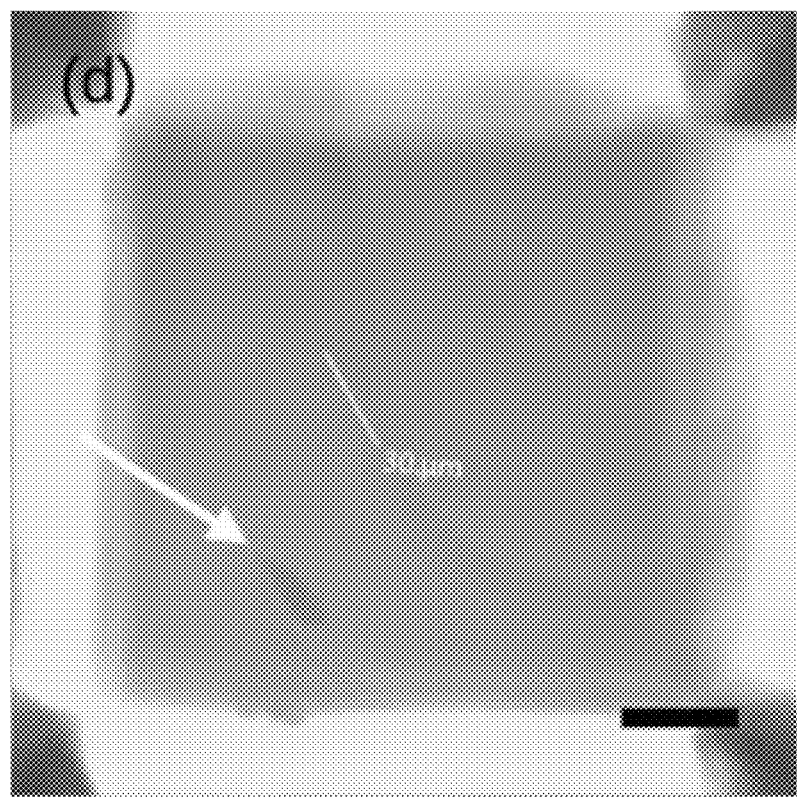
FIG. 8D is an image depicting a flake attached to a PC film, such that the flake is lifted away from the $SiO_2$ substrate, according to an embodiment of the present disclosure.
Figure 8E:
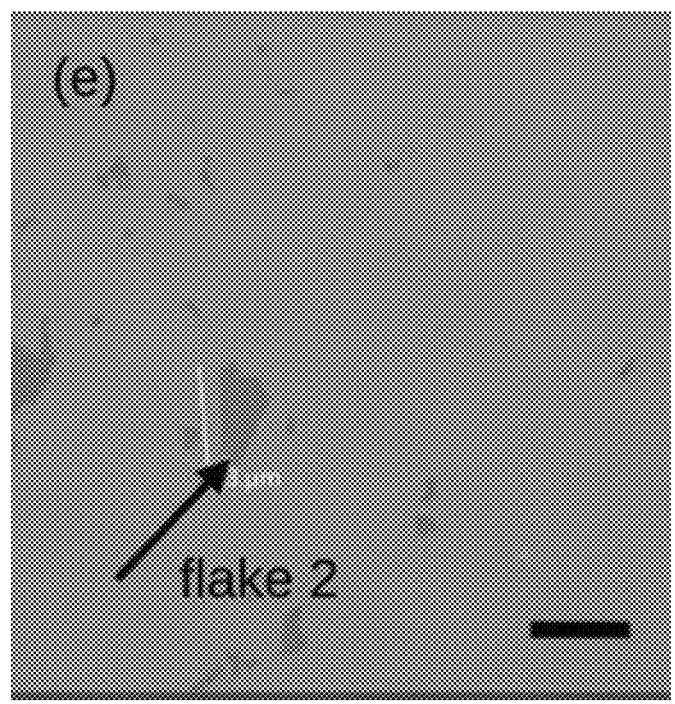
FIG. 8E is an image depicting an identified second multilayer graphene flake, according to an embodiment of the present disclosure.
Figure 8F:
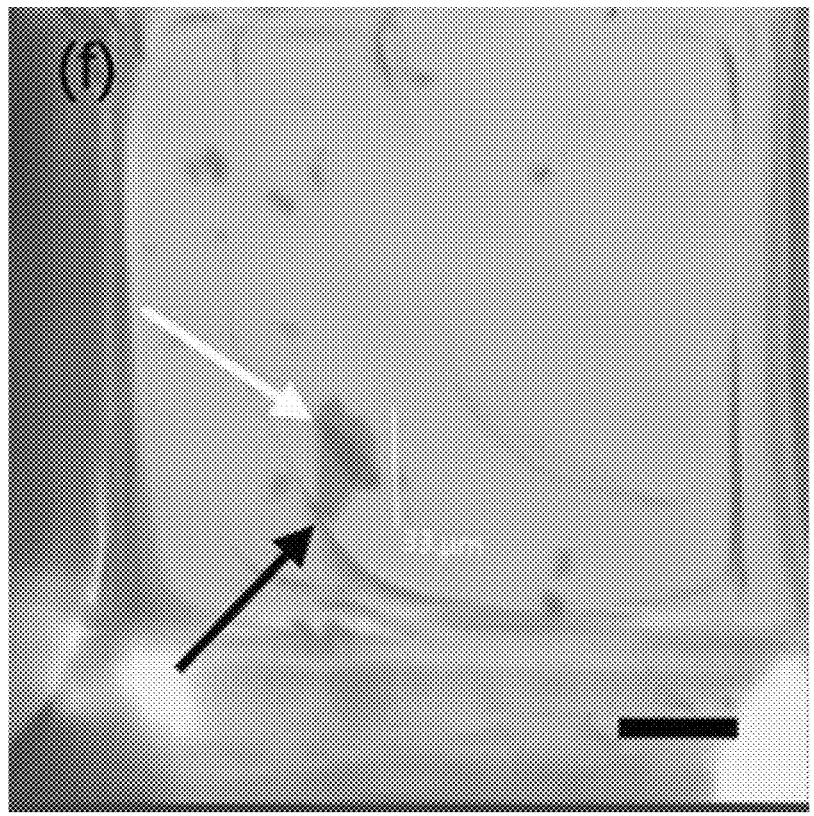
FIG. 8F is an image depicting a first flake aligned and engaged with a second flake, according to an embodiment of the present disclosure.
Figure 8G:
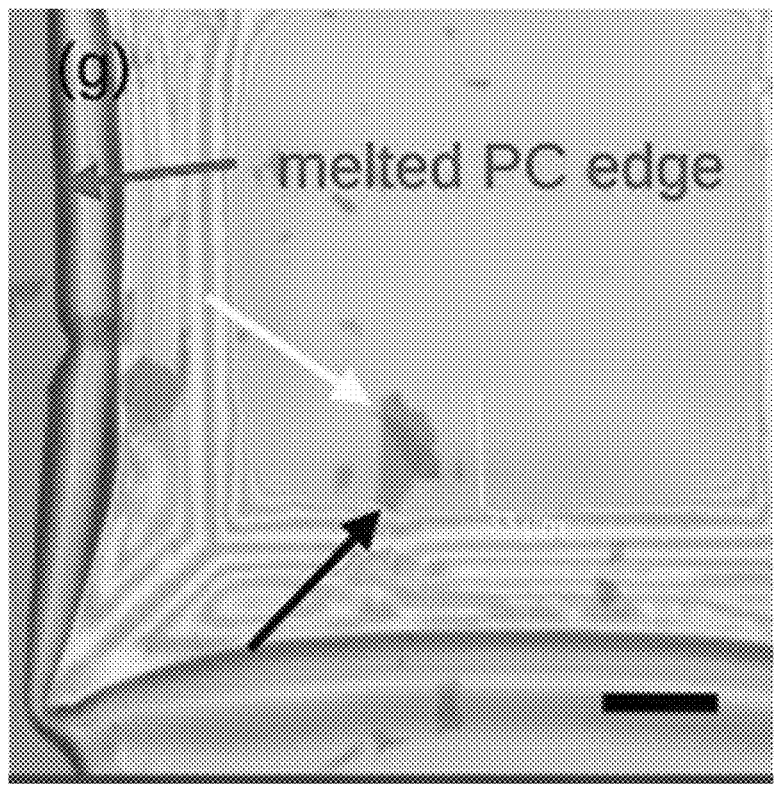
FIG. 8G is an image depicting a sample heated to a temperature of 175° C., which melts the PC film and detaches it from the PDMS, such that the first flake is released onto the second flake, according to an embodiment of the present disclosure.
Figure 8H:
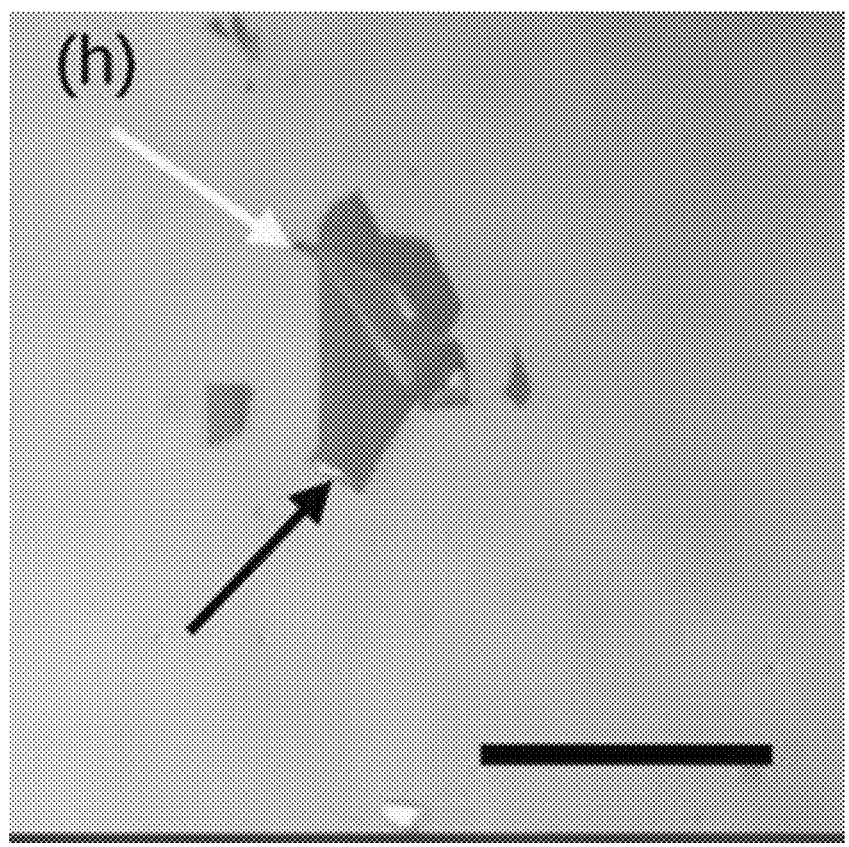
FIG. 8H is an image depicting a resulting graphene stack after a sample is cooled, removed from a transfer station, and is gently soaked in chloroform for 10 minutes to remove the PC, according to an embodiment of the present disclosure.

As shown in FIG. 1, in conjunction with FIGS. 6-8H, in an embodiment, the video detector apparatus may comprise a magic angle graphene stack, such that the graphene stack may be fully encapsulated with at least one hexagonal boron nitride (hereinafter "hBN") flake. As such, in this embodiment, the at least one hBN flake may encapsulate the graphene stack, via a cut-and-stack method, as shown in FIG. 6 and FIG. 7. As such, a pyramidal polydimethylsiloxane (hereinafter "PDMS", e.g., Syl Gard 180) stamp may be incorporated into the apparatus having a predetermined edge length. For example, in some embodiments, the PDMS may comprise a plateau edge comprising at least 180 μm in length. In addition, in an embodiment, the video detector apparatus may further comprise a sacrificial layer between a top layer hBN and the PDMS. In this manner, the sacrificial layer may comprise a poly carbonate (e.g., bisphenol A carbonate) (hereinafter "PC"), such that the hBN encapsulating flakes may serve as at least one gate dielectric. Accordingly, in some embodiments, the at least one hBN think may have a thickness of at least 20 μm.

Next, as shown in FIG. 1, in conjunction with FIGS. 8A-8H, in an embodiment, the stack may be transferred onto a prefabricated gold/chromium back gate and/or heated to at least 175° C., such that a PC film may be melted, detaching it from the PDMS stamp. Further, in this embodiment, the device chip of the video detector apparatus may then be cooled, removed from the transfer station, and/or gently soaked in chloroform to dissolve the PC residue. Next, at least one bottom-gate (hereinafter "BG") contact and/or at least one top gate (hereinafter "TG") contact may be applied by electron-beam lithography for bias control of the Fermi level and/or creation of the JJ weak link, respectively. Finally, as shown in FIG. 1, at least one bowtie antenna may be disposed about the video detector apparatus and/or the at least one bowtie antenna may be fabricated by contact photolithography with the stack placed at the feed of the antenna.

As such, FIG. 1 depicts an exemplary schematic of the video detector apparatus, according to an embodiment of the present disclosure. In an embodiment, superconductivity within the apparatus, via a magic-angle-twist graphene, may be achieved by suitable gating. In addition, in this embodiment, a JJ normal weak link may be achieved by different localized gating. Moreover, in an embodiment, the hexagonal boron nitride (hereinafter "hBN") may be used as a gate dielectric. A DC current bias through the JJ may also be sourced through the antenna (e.g., Source and/or Drain) of the video detector apparatus, such that the video detector apparatus may be configured to measure the DC voltage and/or current. In this embodiment, the antenna of the video detector apparatus may also be configured to collect a THz/mm-wave radiation and/or may be configured to source an associated AC current to the JJ at the feed.

As known in the art, antennas may be configured to THz/mm-wave radiation with an effective area that is orders of magnitude larger than any possible graphene sensing element at the antenna feed. By definition, absorption is 100% for radiation that falls within an antenna's effective area [13], while the absorption of graphene itself is thought to be less than 10% [5]. The excited antenna currents are concentrated in the JJ load, thus amplifying the AC voltage across the JJ that is responsible for the video detection mechanism. In addition, as known in the art, antennas also may be configured to provide wavelength and polarization selectivity [14]. As such, the antennas are easily fabricated into arrays and/or may be combined in series or parallel to enhance DC output voltage or current, respectively. The antenna function is largely independent of temperature, and it is accurately predicted by numerical electrodynamic simulations. Antenna coupling separates collection and detection functions, so that each can be independently optimized [13].

Figure 2:
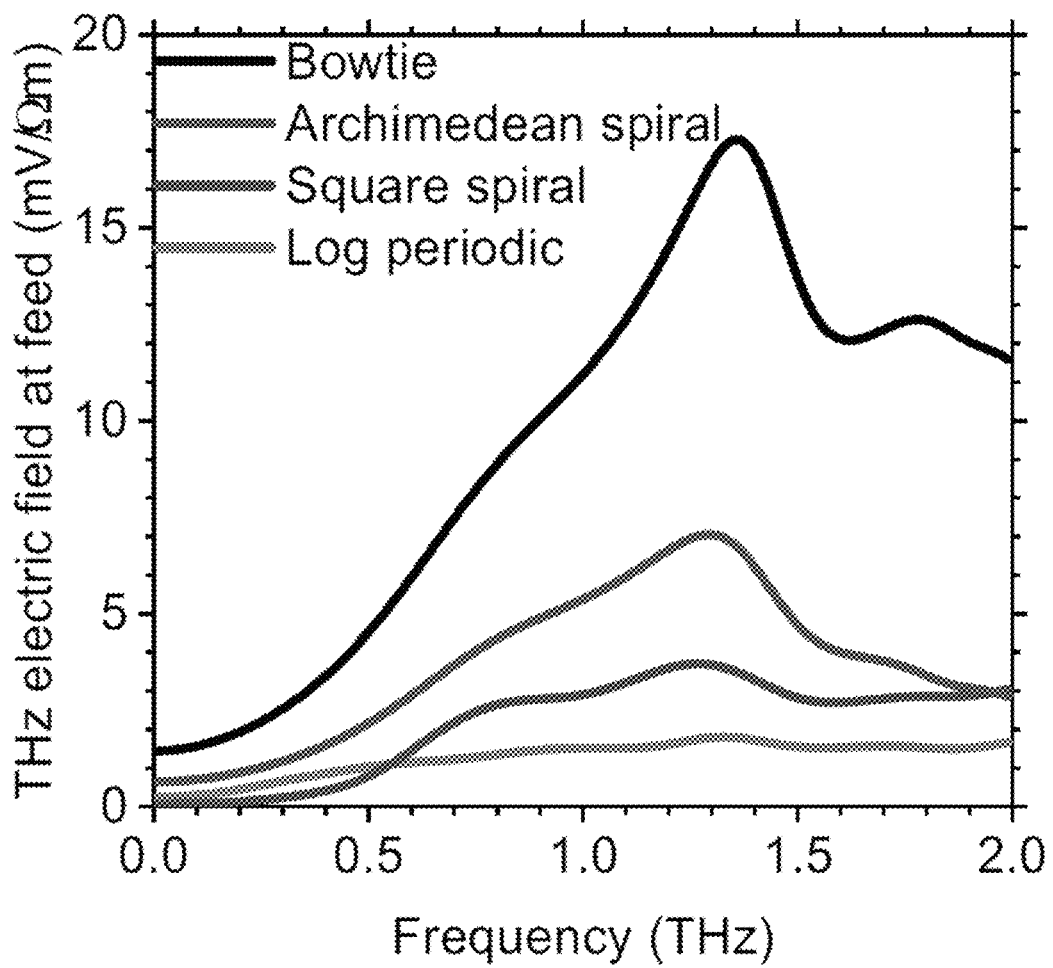
FIG. 2 is a plot depicting COMSOL simulations of electric field at the feed for various antenna designs with no load for a video detector apparatus, according to an embodiment of the present disclosure.
Figure 3:
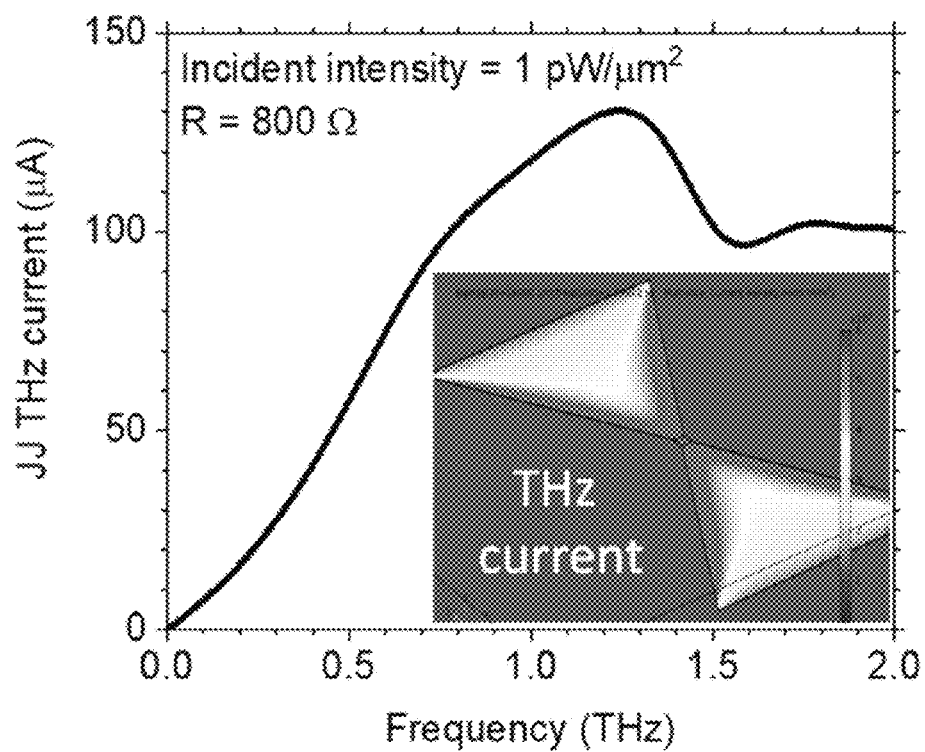
FIG. 3 is a plot depicting COMSOL simulation of current vs. photon frequency for a bowtie antenna with 800Ω load and 1 pW/μm² incident intensity of a video detector apparatus, in addition to an inset comprising a current distribution in the bowtie antenna, having a 80 μm length, according to an embodiment of the present disclosure.

Accordingly, as shown in FIG. 2, in an embodiment, the video detector apparatus may be configured to compare COMSOL simulations of open-circuit voltage at the antenna feed for a plurality of antenna designs. As such, a THz resonance may then be observed, such that the antenna design (e.g., a bowtie antenna design) may provide the highest AC voltage. Furthermore, as shown in FIG. 3, the video detector apparatus may be configured to transmit the current through at least an 800Ω load at the feed of an antenna (e.g., a bowtie antenna) for 1 pW/μm$^2$ incident intensity. The inset shows the calculated AC current distribution in the antenna and its concentration at the feed.

Figure 4:
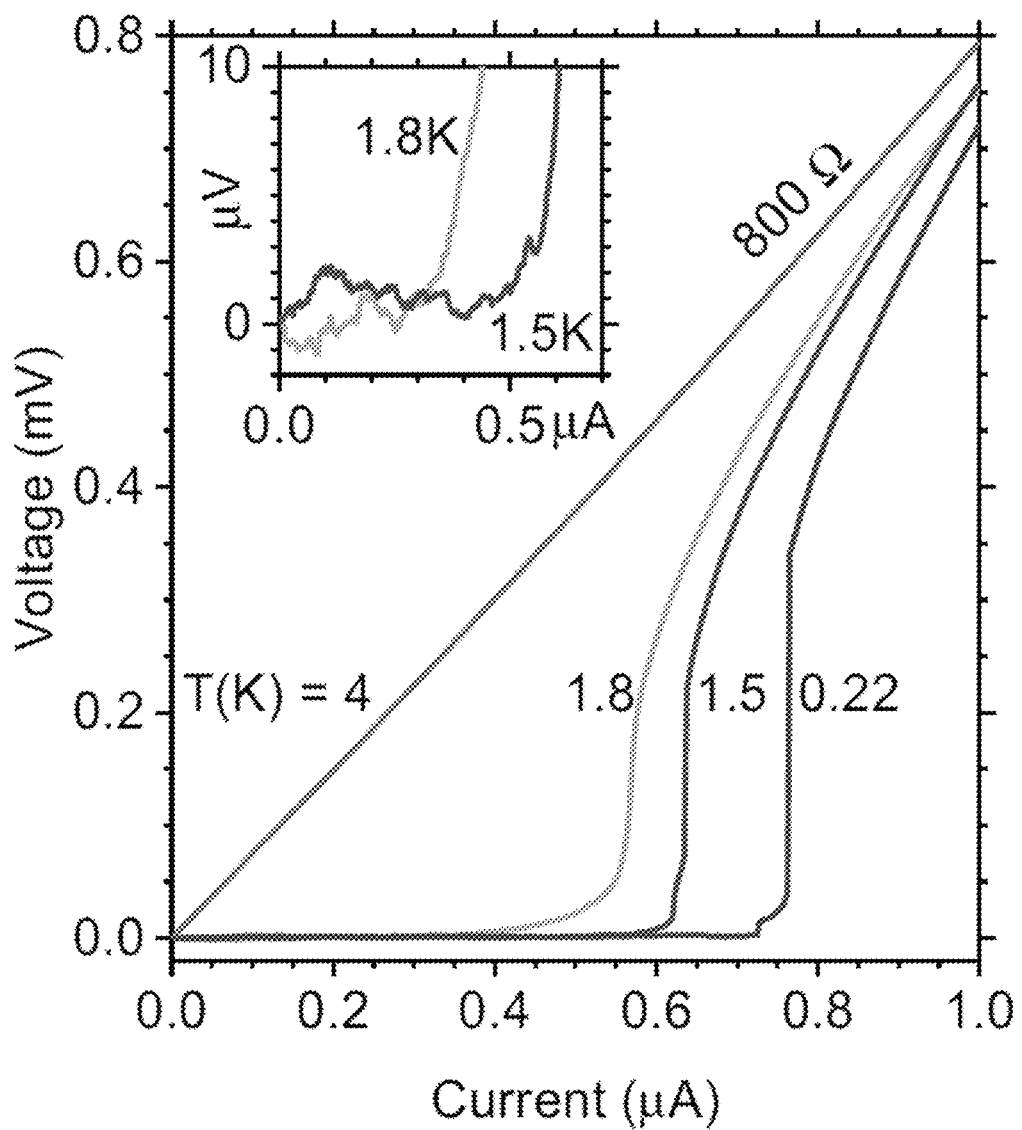
FIG. 4 is a plot depicting voltage-current curves for superconducting graphene Josephson junction of a video detector apparatus, in addition to an inset comprising a blow-up to reveal a ~1 μV noise level, according to an embodiment of the present disclosure.

Additionally, FIG. 4 depicts JJ Voltage-Current (VI) curves of the video detector apparatus, according to an embodiment of the present disclosure. In this embodiment, the VI curve of the video detector apparatus may have a maximum zero voltage current, $I_1$, (e.g., JJ switching current). The $I_1$ value may become depressed when an AC voltage appears across the JJ. Said AC voltage may result from an AC current through the JJ and sourced by the antenna, and driven by external electromagnetic radiation. In some embodiments, the video detector may be current biased at the value $I_1$ before external radiation impinges on the antenna, and under such conditions, the DC voltage measured across the JJ will be zero. When external electromagnetic radiation impinges on the antenna, driving an AC current through the JJ, an AC voltage may appear across the JJ. This is possible, because the AC impedance of the JJ is non-zero even when the DC resistance of the JJ is zero. In response to the AC voltage across the JJ, the $I_1$ value will be depressed to a new and smaller value, such that the constant current bias then appears above the new $I_1$ value. Then, a DC voltage will appear across the JJ. This DC voltage is a measure of the incident external electromagnetic radiation. Furthermore, in some embodiments, the sensitivity of the video detector apparatus to incident electromagnetic radiation may be due to the steepness of a VI curve at the bias point.

Figure 5:
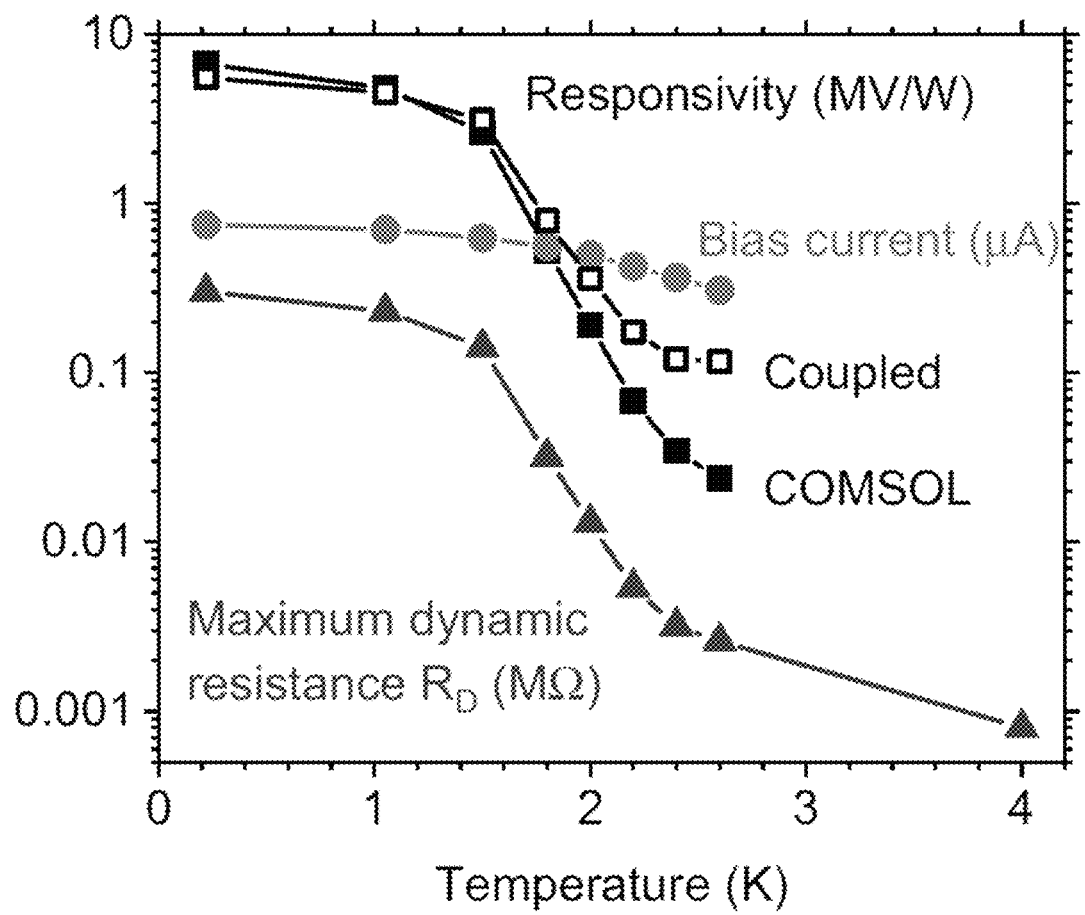
FIG. 5 is a plot depicting temperature dependence of optimum DC current bias, dynamic resistance at a bias point, and responsivity calculated by numerical and analytical methods for a video detector apparatus, according to an embodiment of the present disclosure.

Moreover, as shown in FIG. 5, in an embodiment, the $I_1$ value of the video detector apparatus may be configured to shift similarly downward to smaller values with increasing temperature, such that a bolometric mechanism of the video detector apparatus may arise. Since, in addition to generating an AC voltage across the JJ, external incident electromagnetic radiation may heat and cause a temperature rise in the JJ, in some embodiments there may exist a bolometric mechanism simultaneously with the video mechanism. Because the response speed of the bolometric mechanism is limited by the thermal time constant for the dissipation of the absorbed heat, the speed of the detector will be degraded by the coexistence of a bolometric mechanism. Thus, for highest speed applications, the bolometric mechanism should be suppressed. Excellent thermal grounding may suppress a bolometric contribution to a detector apparatus.

Moreover, in an embodiment, the video detector apparatus may further comprise an ideal junction, the ideal junction comprising a pair tunnelling current and/or a parallel shunt resistor R, such that the ideal junction of the video detector apparatus may be configured to carry at least a quasiparticle current. In addition, as shown in FIG. 4, the value of R is the normal state resistance of the ideal junction of the video detector and may be about 800Ω. In this embodiment, a THz photon energy of the video detector apparatus may also be configured to exceed the superconducting gap, such that the THz current may pass mainly through R. In addition, the antenna (e.g., bowtie, log-periodic, square spiral, and Archimedean spiral antennas) of the video detector apparatus may source a THz electric field at the feed, such that the video detector apparatus comprises a high level of responsivity, as shown in FIG. 3. As such, FIG. 3 depicts COMSOL simulation results for 1 pW/μm$^2$ incident power, according to an embodiment of the present disclosure.

The downward shift $\delta I_1$ in the maximum zero-voltage current $I_1$ caused by an AC voltage $V_{THz}$ at frequency $\omega$ across the JJ may be provided by the following equation:

$$\delta I_1 = -(2eV_{THz}/\hbar\omega)^2 I_1/4 \qquad (1)$$

In Equation (1), "e" may represent the charge of an electron and hbar is Planck's constant.

In this manner, in this embodiment, the squared factor may represent the ratio of the pair energy on the two sides of the JJ of the video detector apparatus to the photon energy. Additionally, in some embodiments, the video detector apparatus may be configured to be DC current biased at $I_1$, which is the maximum zero-voltage current of the JJ. In other embodiments, the jump in voltage in the VI curve at $I_1$ may not be infinitely sharp, so that it is more advantageous to current bias the video detector at the point with the maximum dynamic resistance $R_D=dV/dI$. As such, in these other embodiments, $R_D$ and/or $I_1$ may be identified from the DC transport curves, as shown in FIG. 4, and are plotted as function of temperature in FIG. 5. The shift $\delta I_1$ in the $I_1$ value of the video detector apparatus results in the following DC output voltage:

$$\delta V_{out} = R_D \delta I_1 \qquad (2)$$

As such, in an embodiment, the response of the video detector apparatus, as shown in Eq. (2), may be proportional to absorbed power, according to Eq. (1). For example, in some embodiments, with impedance mismatch between antenna and/or load already accounted for in the COMSOL simulation, the maximum $I_{THz}^2=130$ μA, as shown in FIG. 3, may give an absorbed power $I_{THz}^2 R=13.5$ mW at 1.25 THz. Furthermore, in an embodiment, the responsivity (e.g., $\delta V_{out}$/absorbed power) of the video detector apparatus may be about 7×10$^6$ V/W at 0.2 K operating temperature, as shown in FIG. 5. In this embodiment, the responsivity of the video detector apparatus may be about 10× smaller at a temperature of at about 1.7 K than at a temperature of at most 0.3 K.

Alternatively, in an embodiment, the coupled power responsivity of the video detector apparatus may determine by the following equation:

$$S = R_D/(2I_1 R\Omega^2) \qquad (3)$$

In this equation, πΩ may approximately equals the ratio of photon energy to gap for the video detector apparatus. For example, in some embodiments, at 1.25 THz, the value of Ω may be about 5. As such, in an embodiment, the impedance of the antenna (e.g., bowtie antenna) acting as a current source may be about 300 Ω at about 1.25 THz frequency. As such, in this embodiment, the antenna of the video detector apparatus may be configured to couple 55% of the absorbed optical power to an at least 800Ω load at its feed. To obtain better coupling of the power to the load, the impedance of the antenna (e.g., bowtie antenna) of the video detector apparatus may be configured to be adjusted, such that by changing a shape of the antenna of the video detector apparatus, the responsivity of the video detector apparatus may be optimized.

Moreover, as shown in FIG. 4, in an embodiment, the broad-spectrum noise amplitude of the video detector apparatus may be at least about 1 μV. As such, in this embodiment, the noise-equivalent-power (NEP) of the video detector apparatus may not be worse than at least 0.14 pW. In this manner, the NEP of the video detector apparatus may be configured to be smaller (i.e., improved and/or optimized), when the noise spectral bandwidth of the video detector apparatus may be adjusted to at most 1 Hz. For example, in some embodiments, the noise spectral bandwidth may be adjusted to at most 1 Hz, via lock-in detection. Additionally, in an embodiment, an NEP of the video detector apparatus may correspond to a photon flux at a predetermined photon frequency. For example, in some embodiments, the NEP of at least 0.14 pW may correspond to a photon flux of at least roughly 1 photon every 6 ns at an electromagnetic-wave oscillation frequency of at least 1.25 THz.

In an embodiment, a magic angle graphene of the video detector apparatus may be produced by polymer-assisted and/or van der Waals material-assisted stamp transfer. As such, in this embodiment, at least one inverted pyramidal trunk stamp may be fabricated from polydimethylsiloxane (i.e., PDMS) by casting PDMS into at least one pyramidal mold etched in a material comprising silicon-like properties (e.g., silicon), such that the at least one inverted pyramidal trunk stamp may be patterned by contact photolithography. Subsequent to unmolding, the pyramidal trunk stamp may be placed at the end of a slide handle (e.g., a glass slide handle) and/or the at least one pyramidal trunk stamp may then be covered with a thin sheet of poly(bisphenol A carbonate) (i.e., PC). Next, in this embodiment, at least one monolayer graphene flake may be stacked with "magic" angular alignment. In this manner, to ensure accuracy in the rotational alignment, at least one graphene flake may be sliced and/or separated into two pieces such that both flake pieces may be guaranteed to comprise the same initial orientation. For example, in some embodiments, at least one monolayer graphene flake of the video detector apparatus may be exfoliated up to at most roughly 50 μm in size. Moreover, in an embodiment, the at least one graphene flake may be sliced and/or separated proportionally (e.g., in half) using at least one tungsten scribe. In these other embodiments, the at least one tungsten scribe may be attached to a micromanipulator.

Conclusion

In an embodiment, the video detector apparatus may be faster than the bolometric-mechanism. Hence, the video detector apparatus may have advantages for certain applications, such as high-bit-rate quantum communication and/or cryptography. In this manner, the responsivity, noise-equivalent-power, and/or noise-equivalent-photon flux for the video detector apparatus may be estimated via at least one voltage-current curve, numerical calculations, and/or analytical theory. As such, in this embodiment, the video detector apparatus may be configured to detect single-photons.

The following example(s) is (are) provided for the purpose of exemplification and is (are) not intended to be limiting.

EXAMPLES

Example 1

Antenna-Coupled Graphene Josephson-Junction Terahertz Detector

Emerging 5G and 6G (mm-wave to THz) technologies offer an interesting new spectral domain for quantum communication and cryptography, which often demand both single-photon sensitivity and high speed [1]. A single-photon detector of mm-waves to low-THz has been suggested recently for this application [2]. An opportunity for a fast and sensitive THz to mm-wave detector is a "video"-mechanism [3] antenna-coupled, magic-angle-twist-graphene superconducting Josephson junction (JJ) [4]. JJs also have a bolometric detection mechanism, which can be very sensitive, but the video-mechanism has "very great speed advantage over the bolometer" [3]. A superconducting "magic angle twisted bilayer graphene" bolometer without a JJ detected via the temperature dependence of the critical current [5]. JJ bolometers using non-superconducting-graphene as the weak link between conventional superconductors have demonstrated single-photon sensitivity [6]-[10]. In contrast, this paper considers a detector based on the video (non-bolometric) mechanism in a JJ-based entirely on superconducting-graphene. The potential speed advantage of the video-over bolometric-mechanism may have advantage for quantum cryptography at high-bit-rate [11].

A "magic" twist angle between graphene sheets flattens the electronic band structure near the Dirac point, creating a high density of states and the possibility of superconductivity [12]. The superconducting transition temperature is ~2 K for 2-4 layers, and superconducting-graphene JJs have been demonstrated [12]. This paper considers the possibility of creating ultrasensitive detectors of THz and mm-waves by coupling such JJs to antennas. FIG. 1 presents a schematic of the proposed device design. Superconductivity in the magic-angle-twist graphene is achieved by suitable gating. The JJ normal weak link is achieved by different localized gating. Hexagonal boron nitride (hereinafter "hBN") is the gate dielectric. DC current bias through the JJ is sourced through the antenna (e.g., source and/or drain) while measuring the DC voltage. The antenna collects THz/mm-wave radiation and sources the associated AC current to the JJ at the feed.

Antennas collect THz/mm-wave radiation with an effective area that is orders of magnitude larger than any possible graphene sensing element at the antenna feed. By definition, absorption is 100% for radiation that falls within an antenna's effective area [13], while the absorption of graphene itself is thought to be less than 10% [5]. The excited antenna currents are concentrated in the JJ load, thus amplifying the AC voltage across the JJ that is responsible for the video detection mechanism. Antennas also provide wavelength and polarization selectivity [14]. They are easily fabricated into arrays and may be combined in series or parallel to enhance DC output voltage or current, respectively. The antenna function is largely independent of temperature, and it is accurately predicted by numerical electrodynamic simulations. Antenna coupling separates collection and detection functions, so that each can be independently optimized [13].

FIG. 2 compares COMSOL simulations of open-circuit voltage at the antenna feed for four different antenna designs [14]. A THz resonance is observed, and the bow-tie gives the highest AC voltage. FIG. 3 presents the current through an 800Ω load at the feed of a bowtie antenna for 1 pW/μm² incident intensity. The inset shows the calculated AC current distribution in the antenna and its concentration at the feed.

FIG. 4 depicts JJ Voltage-Current (VI) curves replotted from [12]. In the video detector mechanism, the maximum zero voltage current, $I_1$, (JJ switching current) is depressed when an AC voltage appears across the JJ. Such a voltage appears when an AC current is driven through a JJ load, sourced by an antenna, because the AC impedance of the JJ is non-zero even when the DC resistance is zero. The device is current biased at the dark value of $I_1$. When mm-waves or THz are absorbed by a suitable antenna with the JJ at its feed, $I_1$ shifts below the bias point, and a DC voltage appears across the JJ. The sensitivity of the device is due to the steepness of the VI curve at the bias point.

The/1 value shifts similarly with increasing temperature, as shown in FIG. 5, giving rise to the bolometric mechanism, which can be very sensitive. For such thermal detectors, speed is determined by the thermal time-constant, which is short for graphene due to its small heat capacity. However, the non-bolometric "video" mechanism is thought to be faster and still very sensitive [3]. Experimentally, excellent thermal grounding could suppress a bolometric contribution to a video detector.

The resistively shunted junction (i.e., RSJ) model for JJ detectors comprises an ideal junction with only pair tunnelling current and a parallel shunt resistor R that carries only quasiparticle current. The value of R is the normal state resistance [3], which, as shown in FIG. 4 is 800Ω. THz photon energies exceed the superconducting gap, so THz currents pass mainly through R. Additional inductive reactance determined from the Josephson equations [3] depends on AC current, so its estimation is complicated. R, the lower bound on impedance, is assumed for the responsivity estimates. Among bowtie, log-periodic, square spiral, and/or Archimedean spiral antennas, the bowtie gives the highest THz electric field at the feed, and hence should give the highest responsivity. FIG. 3 presents COMSOL simulation results for 1 pW/mm² incident power.

The shift $\delta I_1$ in $I_1$ caused by AC voltage $V_{THz}$ at frequency ω across the JJ, according to [3], is the following:

$$\delta I_1 = -(2eV_{THz}/\hbar\omega)^2 I_1/4 \qquad (1)$$

The e and hbar are fundamental constants, electron charge and Planck's constant, respectively. The squared factor is the ratio of the pair energy on the two sides of the junction to the photon energy. The detector is assumed to be DC current biased at $I_1$, which is taken to be the point with the maximum dynamic resistance $R_D$=dV/dI. $R_D$ and $I_1$ are found from the DC transport curves, as shown in FIG. 4, and are plotted as function of temperature, as shown in FIG. 5. The shift results in the following DC output voltage, which is the measure of the detected radiation:

$$\delta V_{out} = R_D \delta I_1 \qquad (2)$$

As such, as disclosed above, the response in Eq. (2) is proportional to absorbed power $V_{THz}^2/R$. With impedance mismatch between antenna and load already accounted for in the COMSOL simulation, the maximum $I_{THz}$=130 HA, as shown in FIG. 3, gives an absorbed power $I_{THz}^2 R$=13.5 mW at 1.25 THz. The temperature dependence of the responsivity (e.g., $\delta V_{out}$/absorbed power) is plotted as solid black symbols as shown in FIG. 5 and labeled "COMSOL". The maximum value is 7×106 V/W. Responsivity is ~10× smaller at T=1.7 K than at 0.3 K.

Alternatively, the coupled power responsivity for a JJ detector is the following:

$$S = R_D/(2I_1 R\Omega^2) \qquad (3)$$

The quantity πΩ approximately equals the ratio of photon energy to gap [3]. At 1.25 THz, Ω~5. The impedance of the bowtie antenna acting as a current source is 300Ω at the 1.25 THz resonance, so that it will couple 55% of the absorbed optical power to an 800Ω load at its feed. Accounting for this mismatch, the responsivity curve was obtained and given by open square symbols in FIG. 5 and labeled "coupled". The results agree well with those of the COMSOL simulation over most of the temperature range. Since the impedance of a bowtie can be adjusted by changing its shape, responsivity can be improved.

By expanding the V-I data from [12], the broad-spectrum noise amplitude was found to be ~1 μV, as shown in the inset of FIG. 4. Thus, the noise-equivalent-power (NEP) is not worse than 0.14 pW. It would be much smaller (better) if the noise spectral bandwidth is restricted to just 1 Hz, as is usually done via lock-in detection. An NEP of 0.14 pW, corresponds to a photon flux at 1.25 THz of ~1 photon every 6 ns. The prospects for single-photon detection seem good.

Magic angle graphene may be produced by polymer-assisted and van der Waals material-assisted stamp transfer. The inverted pyramidal trunk stamps are first fabricated from polydimethylsiloxane (PDMS) using the method described in [6] by casting PDMS into pyramidal molds etched in silicon and patterned by contact photolithography. After unmolding, the pyramidal PDMS is placed at the end of a glass slide handle and is then covered with a thin sheet of poly(bisphenol A carbonate) (PC). Next, monolayer graphene flakes are stacked with "magic" angular alignment. To ensure accuracy in the rotational alignment, one may first slice a graphene flake into two pieces [7], guaranteeing that both flake pieces have the same initial orientation. The monolayer graphene flakes are able to be exfoliated up to 50 μm in size, with monolayer thickness verified by micro Raman spectroscopy. It is also demonstrated that the graphene flakes could be sliced in half using a tungsten scribe attached to a micromanipulator.

Fabrication of Device

FIG. 6 depicts a schematic of the graphene stacking station for manufacturing the video detector apparatus, according to an embodiment of the present disclosure. As such, in an embodiment, as shown in FIG. 7, a stock manipulator comprising at least 3 degrees of freedom, namely x, y translation and rotation about a vertical axis with 4 mrad accuracy is used to stack at least one flakes of graphene in the video detector apparatus manufacturing process. In some embodiments, a stock manipulator comprising at least 5 degrees of freedom, namely x, y, z, tilt, and/or tip may be used to stack graphene for the video detector apparatus. In this manner, as shown in FIGS.

8A-8H, at least two graphene flakes may be aligned within roughly 2 μm of a target alignment. After fabrication of magic angle graphene, contacts for bias control the Fermi level and/or creation of the JJ weak link will be fabricated by electron-beam lithography. Bowtie antennas will be fabricated by contact photolithography.

Conclusion

An antenna-coupled Josephson junction video detector entirely fabricated from superconducting-graphene was considered, in contrast to the well-studied JJ bolometers that use a normal graphene weak link between conventional superconductors [6-10]. The video detection mechanism is expected to be faster than the bolometric-mechanism [3]. Hence, the considered detector may have advantages for certain applications, such as high-bit-rate quantum communication and cryptography [11]. Responsivity, noise-equivalent-power, and noise-equivalent-photon flux for the considered design were estimated using published voltage-current curves [12], numerical calculations, and analytical theory. The estimate suggests that the device has the potential to detect single-photons.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

[1] M. D. Eisaman, J. Fan, A. Migdall, S. V. Polyakov, Invited review article: single-photon sources and detectors. Rev. Sci. Instr. 82, 071101 (2011). https://doi.org/10.1063/1.36106 77.

[2] V. F. Guedes, F. A. Mendonca, J. B. R. Silva, R. V. Ramos, Discrete variable quantum key distribution in millimeter-wave and THz regions. TechRxiv (2021). https://doi.org/10.36227/techr xiv.15091 338.v1.

[3] P. L. Richards, The Josephson junction as a detector of micro-wave and far-infrared radiation, Chapter 6, in Semiconductors and Semimetals, vol. 12, ed. by R. K. Willardson, A. C. Beer (Elsevier, Amsterdam, 1977), pp. 395-440.

[4] Office of the Secretary of Defense (OSD), Small Business Technology Transfer (STTR) Program, Topic Number OSD21C-005 "Twisted graphene-based Josephson junction detectors," (2021).

[5] G. Di Battista, P. Seifert, K. Watanabe, T. Taniguchi, K. C. Fong, A. Principi, D. K. Efetov, Revealing the thermal properties of superconducting magic-angle twisted bilayer graphene. Nano Lett. 22, 6465-6470 (2022). https://doi.org/10.1021/acs.nanol ett.1c045 12.

[6] G. H. Lee, D. K. Efetov, W. Jung, L. Ranzani, E. D. Walsh, T. A. Ohki, T. Taniguchi, K. Watanabe, P. Kim, D. Englun, K. C. Fong, Graphene-based Josephson junction microwave bolometer. Nature 586, 42 (2020). https://doi.org/10.1038/s41586-020-2752-4.

[7] R. Kokkoniemi, J.-P. Girard, D. Hazra, A. Laitinen, J. Govenius, R. E. Lake, I. Sallinen, V. Vesterinen, M. Partanen, J. Y. Tan, K. W. Chan, K. Y. Tan, P. Hakonen, M. Möttönen, Bolometer operating at the threshold for circuit quantum electrodynamics. Nature 586, 47 (2020). https://doi.org/10.1038/s41586-020-2753-3.

[8] E. D. Walsh, W. Jung, G.-H. Lee, D. K. Efetov, B.-I. Wu, K.-F. Huang, T. A. Ohki, T. Taniguchi, K. Watanabe, P. Kim, D. Englund, K. C. Fong, Josephson junction infrared single-photon detector. Science 372, 409 (2021). https://doi.org/10.1126/science.abf55 39.

[9] E. D. Walsh, D. K. Efetov, G.-H. Lee, M. Heuck, J. Crossno, T. A. Ohki, P. Kim, D. Englund, K. C. Fong, Graphene-based joseph-son-junction single-photon detector. Phys. Rev. Appl. 8, 024022 (2017). https://doi.org/10.1103/Phys Rev App lied.8.024022.

[10] X. Du, D. E. Prober, H. Vora, C. B. Mckitterick, Graphene-based bolometers graphene. 2D Mater. 1, 1 (2014). https://doi.org/10.2478/gpe 2014-0001.

[11] C. H. Bennett, G. Brassard, Quantum cryptography: public key distribution and coin tossing. Theor. Comp. Sci. 560, 7 (2014). https://doi.org/10.1016/j.tcs.2014.05.025.

[12] J. M. Park, Y. Cao, L. Q. Xia, L.-Q. Xia, S. Sun, K. Watanabe, T. Taniguchi, P. Jarillo-Herrero, Robust superconductivity in magic angle multilayer graphene family. Nat. Mater. 21, 877 (2022). https://doi.org/10.1038/s41563-022-01287-1.

[13] F. J. González, G. D. Boreman, Comparison of dipole, bowtie, spiral and log-periodic IR antennas. Infrared Phys. & Technol. 46, 418 (2005). https://doi.org/10.1016/j.infra-red.2004.09.002.

[14] C. A. Balanis, Antenna theory: analysis and design, 3rd edn. (Wiley, Hoboken, NJ, 2005).

[15] A. C. Gadelha, D. A. A. Ohlberg, F. C. Santana, G. S. N. Eliel, J. S. Lemos, V. Ornelas, D. Miranda, R. B. Nadas, K. Watanabe, T. Taniguchi, C. Rabelo, P. Paulo de Mello Venezuela, G. Medeiros-Ribeiro, A. Jorio, L. G. Cançado, L. C. Campos, Twisted bilayer graphene: a versatile fabrication method and the detection of variable nanometric strain caused by twist-angle disorder. ACS Appl. Nano Mater. 4, 1858 (2021). https://doi.org/10.1021/acsanm.0c032 30.

[16] H. Hashiba, V. Antonov, L. Kulik, A. Tzalenchuk, S. Komiyama, Sensing individual terahertz photons. Nanotechnology 23, 165203 (2010). https://doi.org/10.1088/0957-4484/21/16/165203.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. An antenna-coupled graphene Josephson-junction THz/mm-wave detector apparatus, the apparatus comprising:
   a magic angle graphene stack;
   a first hexagonal boron nitride ("hBN") flake disposed about a first surface of the magic angle graphene stack;
   a second hBN flake disposed about a second surface of the magic angle graphene stack;
   at least one bottom-gate ("BG") contact disposed about a bottom surface of the second hBN flake;
   at least one top-gate ("TG") contact disposed about at least one portion of an outer surface of the first hBN flake;

at least two bowtie antennas disposed about the first surface of the magic angle graphene stack wherein a wing of the first one of the bowtie antennas is electrically coupled to a first contact region of the magic angle graphene stack and a wing of the second one of the bowtie antennas is electrically coupled to a second contact region of the magic angle graphene stack; and wherein at least a portion of the first hBN flake is interposed between at least two bowtie antennas disposed on the first surface of the magic angle graphene stack whereby the first and second hBN flakes are configured to electrically insulate the magic angle graphene stack from the BG contact, TG contact, or both.

2. The apparatus of claim 1, wherein the second hBN flake encompasses the entire second surface of the magic angle graphene stack.

3. The apparatus of claim 2, wherein at least one bowtie antenna of the at least two bowtie antennas is fabricated by lithography.

4. The apparatus of claim 1, wherein the first hBN flake, second hBN flake, or both is a gate dielectric.

5. The apparatus of claim 4, wherein at least one bowtie antenna of the at least two bowtie antennas is configured to collect a THZ/mm-wave radiation, such that an associated AC current is sourced at the feed of the at least one bowtie antenna.

6. The apparatus of claim 1, wherein at least one bowtie antenna of the at least two bowtie antennas is configured by a designer to exhibit an impedance of about 300Ω at about 1.25 THz frequency.

7. The apparatus of claim 6, wherein the impedance of at least one bowtie antenna of the at least two bowtie antennas is design-tunable whereby altering a shape or geometric parameter of the at least one bowtie antenna during design, a responsivity of the at least one bowtie antenna is optimized.

8. The apparatus of claim 6, wherein the magic angle graphene stack comprises one or more graphene flakes that are exfoliated to a size of up to 50 μm.

9. A method of fabricating an antenna-coupled graphene Josephson-junction THz/mm-wave detector apparatus, the method comprising:

providing at least one monolayer graphene flake;

slicing, via a scribe, the at least one monolayer graphene flake thereby forming at least two portions of graphene having substantially the same initial crystallographic orientation wherein each of the at least two portions of graphene are exfoliated up to a size of up to 50 μm;

stacking the at least two portions of graphene of the monolayer graphene flake with a predetermined rotational misalignment to form a magic-angle graphene stack;

disposing a first hexagonal boron nitride ("hBN") flake over at least a portion of a first surface of the magic-angle graphene stack;

disposing a second hBN flake over an opposing second surface of the magic-angle graphene stack thereby substantially covering the entirety of the second surface of the magic-angle graphene stack;

providing a stamp having a poly(bisphenol A carbonate) ("PC") sacrificial layer configured to pick up, transfer, and release two-dimensional material flakes wherein the stamp comprises a plateau edge of approximately 180 μm formed by casting the stamp into a silicon mold patterned by contact photolithography;

heating the stamp to at least 175° C. to melt and release the PC layer;

forming, via lithography, at least one bottom-gate ("BG") contact on a surface of the second hBN flake and at least two top-gate ("TG") contacts on a surface of the first hBN flake, wherein at least two of the TG contacts are set a predetermined distance from one another to define a Josephson-junction weak-link region; and disposing, via contact lithography, at least two bowtie antennas on the first surface of the magic-angle graphene stack such that respective wings of the bowtie antennas are electrically coupled to corresponding contact regions on opposite sides of the magic-angle graphene stack, and such that the first hBN flake is interposed between the at least two bowtie antennas.

10. The method of claim 9, further comprising the step of, soaking the magic angle graphene stack in chloroform, thereby dissolving all remaining residue of the melted PC film.

* * * * *